(12) United States Patent
Coha et al.

(10) Patent No.: US 6,505,644 B2
(45) Date of Patent: Jan. 14, 2003

(54) DUAL BARREL JET FUEL PUMP ASSEMBLY FOR A FUEL TANK

(75) Inventors: Timothy Francis Coha, Luxembourg (LU); Jill Marie Coha, Burton, MI (US)

(73) Assignee: Delphi Technologies, Inc., Troy, MI (US)

( * ) Notice: Subject to any disclaimer, the term of this patent is extended or adjusted under 35 U.S.C. 154(b) by 147 days.

(21) Appl. No.: 09/756,645

(22) Filed: Jan. 4, 2001

(65) Prior Publication Data

US 2002/0083983 A1 Jul. 4, 2002

Related U.S. Application Data

(60) Provisional application No. 60/210,868, filed on Jun. 9, 2000.

(51) Int. Cl.[7] ............................. F02M 33/02; F02F 5/02
(52) U.S. Cl. ........................ 137/565.22; 137/565.3; 137/574; 123/514
(58) Field of Search ........................ 137/565.22, 574, 137/565.3, 571; 123/514

(56) References Cited

U.S. PATENT DOCUMENTS

| | | | | |
|---|---|---|---|---|
| 3,729,273 A | * | 4/1973 | Shimrony | 417/79 |
| 4,838,307 A | * | 6/1989 | Sasaki et al. | 137/574 |
| 5,078,169 A | * | 1/1992 | Scheurenbrand et al. | 137/574 |
| 5,170,764 A | * | 12/1992 | Tuckey | 123/509 |
| 5,289,810 A | * | 3/1994 | Bauer et al. | 123/510 |

* cited by examiner

Primary Examiner—A. Michael Chambers
(74) Attorney, Agent, or Firm—Vincent A. Cichosz

(57) ABSTRACT

A dual barrel jet fuel pump assembly for a fuel tank in a vehicle includes a reservoir adapted to be disposed in a primary side of the fuel tank and having a top defining an overflow fuel level of the reservoir. The dual barrel jet fuel pump assembly also includes a first conduit conducting return fuel from an engine of the vehicle to the reservoir and a second conduit extending to an auxiliary side of the fuel tank. The dual barrel jet fuel pump assembly further includes a dual barrel jet pump disposed in the reservoir and having a first inlet operatively connected to the first conduit and a second inlet operatively connected to said second conduit to fill the reservoir with fuel from the primary side and auxiliary side of the fuel tank.

24 Claims, 2 Drawing Sheets

DUAL BARREL JET FUEL PUMP ASSEMBLY FOR A FUEL TANK

This Application claims the benefit of 60/210,868, filed Jun. 9, 2000.

TECHNICAL FIELD

The present invention relates generally to fuel tanks for vehicles and, more particularly, to a dual barrel jet fuel pump assembly for a fuel tank of a vehicle.

BACKGROUND OF THE INVENTION

It is known to provide a fuel tank for a vehicle to hold fuel to be used by an engine of the vehicle. In some vehicles, the fuel tank includes a fuel pump module disposed therein with a removable cover sealed to the top of the fuel tank having an electrical connector and a fuel line outlet connector. The fuel pump module includes a fuel reservoir, an electrical fuel pump disposed in the reservoir with an inlet at a bottom thereof, and a secondary pump used to fill the reservoir to overfilling. This overfilling of the reservoir allows the generation of vapors due to the agitation of the fuel as well as the mixing of the hot fuel, being returned from an engine of the vehicle, with bulk fuel.

An example of a fuel pump module is disclosed in U.S. Pat. No. 5,218,942 to Coha et al. In this patent, the fuel pump module includes a fuel pump disposed in the reservoir, a low pressure conduit conducting hot return fuel back to the reservoir, a secondary pump disposed in the reservoir for pumping new fuel from the fuel tank into the reservoir, and a control which effects a recirculation mode of secondary pump operation when the new fuel level in the fuel tank is above a predetermined low level and a scavenge mode of secondary pump operation when the new fuel level in the reservoir is below the predetermined low level. The secondary pump includes a high-pressure jet pump having consistent flow and a float mechanism to switch the jet pump from drawing external fuel to the reservoir and vice versa.

Jet pumps are used extensively in fuel tank reservoirs in both high-pressure and low-pressure versions. These jet pumps are also used as remote devices to scavenge fuel in large fuel tanks and saddle type fuel tanks. In saddle type fuel tanks, there are typically two jet pumps, one to fill the fuel reservoir, and one to scavenge fuel in the remote tank section of the fuel tank. One concern is that the amount of return, or bypass fuel, required to power both jet pumps. Another concern is that a significant increase in the number of components and plumbing required when running a dual jet pump system. Some saddle tank systems incorporate a remote return line jet pump and a high-pressure jet pump that is fed by the fuel pump. In other systems, the high-pressure jet pump is replaced with a first-stage-fill fuel pump. In all cases, these are quite complicated systems and involve a lot of components and plumbing.

Therefore, it is desirable to provide a new jet fuel pump for a fuel tank in a vehicle. It is also desirable to provide a secondary fuel pump for a fuel tank in a vehicle that reduces vapor generation. It is further desirable to provide a secondary fuel pump for a fuel tank in a vehicle that has no moving or extra parts.

SUMMARY OF THE INVENTION

It is, therefore, one object of the present invention to provide a new dual barrel jet fuel pump assembly for a fuel tank in a vehicle.

It is another object of the present invention to provide a dual barrel jet fuel pump assembly for a fuel tank in a vehicle that lifts fuel over a hump on a saddle type fuel tank with a dual jet pump in a fuel reservoir.

To achieve the foregoing objects, the present invention is a dual barrel jet fuel pump assembly for a fuel tank in a vehicle including a reservoir adapted to be disposed in a primary side of the fuel tank and having a top defining an overflow fuel level of the reservoir. The dual barrel jet fuel pump assembly also includes a first conduit conducting return fuel from an engine of the vehicle to the reservoir and a second conduit extending to an auxiliary side of the fuel tank. The dual barrel jet fuel pump assembly further includes a dual barrel jet pump disposed in the reservoir and having a first inlet operatively connected to the first conduit and a second inlet operatively connected to said second conduit to fill the reservoir with fuel from the primary side and auxiliary side of the fuel tank.

One advantage of the present invention is that a dual barrel jet fuel pump assembly is provided for a fuel tank in a vehicle. Another advantage of the present invention is that the dual barrel jet fuel pump assembly allows a primary area and an auxiliary area of the fuel tank to be scavenged with a single unique dual barrel jet pump contained in the primary area of the fuel tank. Yet another advantage of the present invention is that the dual barrel jet fuel pump assembly reduces the number of components and complexity.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
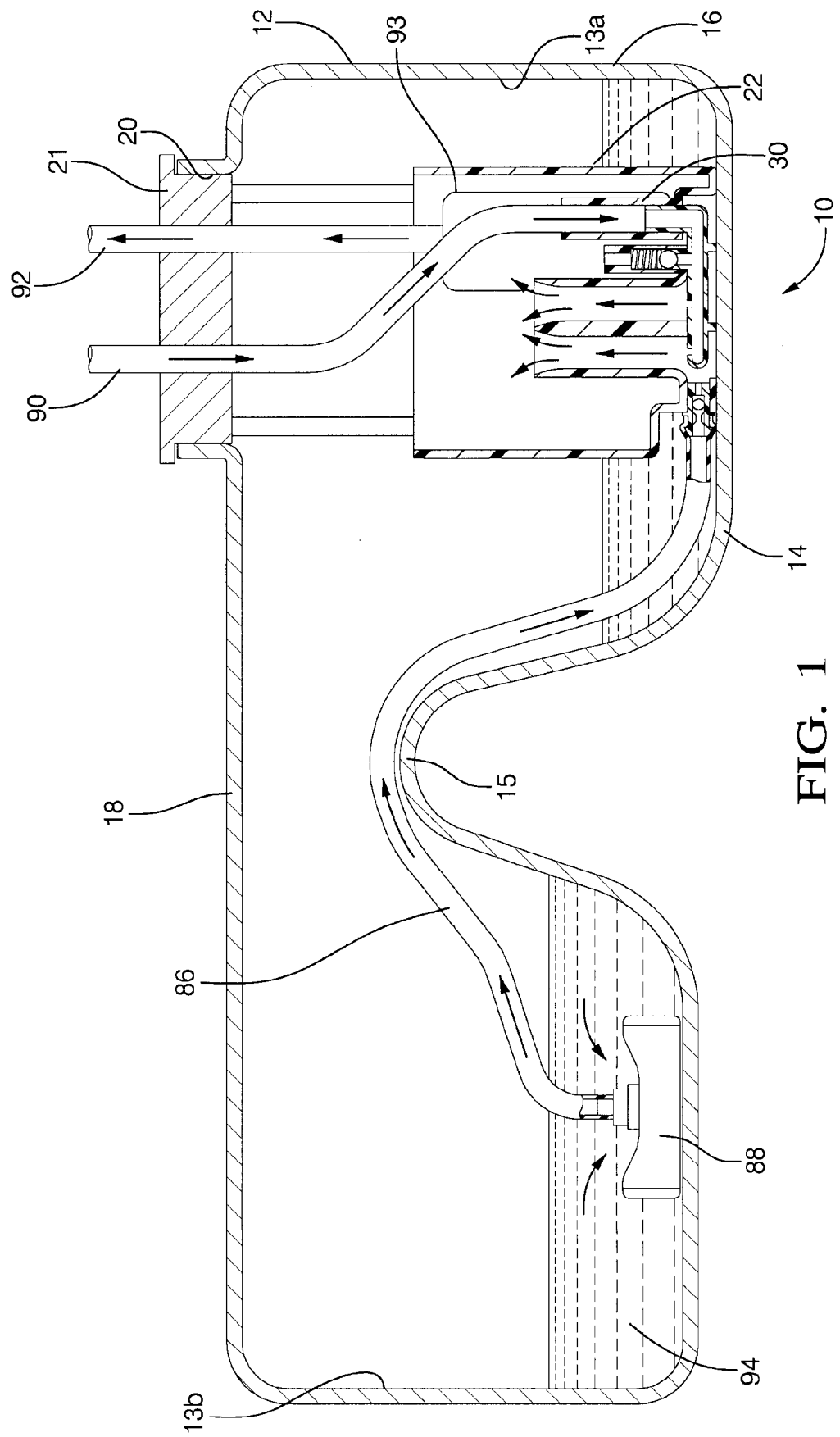
FIG. 1 is a fragmentary elevational view of a dual barrel jet fuel pump assembly, according to the present invention, illustrated in operational relationship with a fuel tank of a vehicle.
Figure 2:
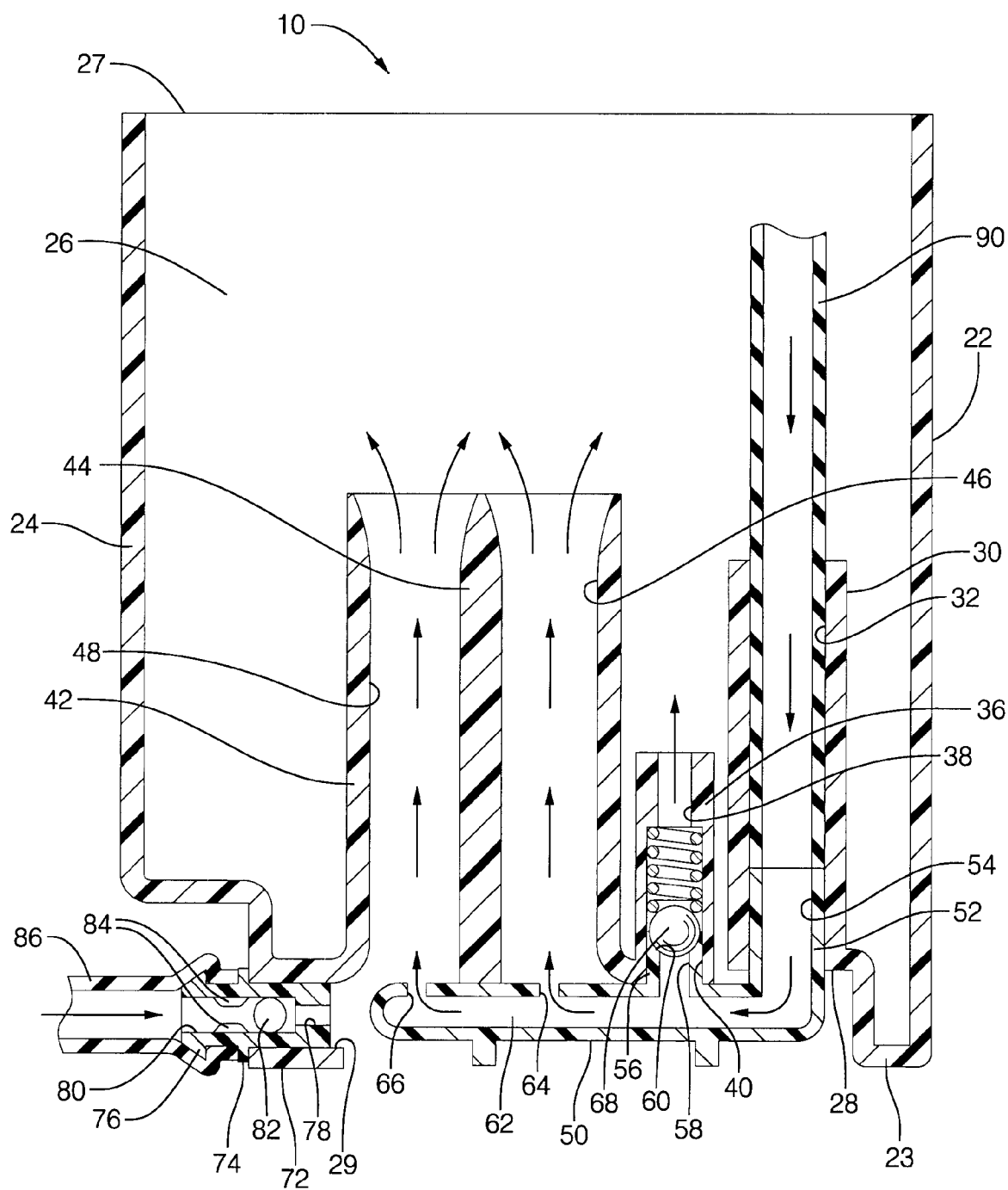
FIG. 2 is an enlarged view of the dual barrel jet fuel pump assembly of FIG. 1.

Referring to the drawings and in particular FIGS. 1 and 2, one embodiment of a dual barrel jet fuel pump assembly 10, according to the present invention, is shown for a fuel tank, generally indicated at 12, in a vehicle (not shown). In this embodiment, the fuel tank 12 is of a saddle type having a primary tank portion 13a and a secondary or auxiliary tank portion 13b. The fuel tank 12 has a bottom wall 14 with a hump 15 formed therein near a center thereof and extending upwardly. The fuel tank 12 also has a side wall 16 around a periphery of the bottom wall 14 and extending generally perpendicular thereto. The fuel tank 12 has a top wall 18 around a periphery of the side wall 16 and extending generally perpendicular thereto. The fuel tank 12 is made of a rigid material such as plastic. The top wall 18 includes at least one opening 20 for a fuel tank cover 21. It should be appreciated that, except for the dual barrel jet fuel pump assembly 10, the fuel tank 12 is conventional and known in the art.

The dual barrel jet fuel pump assembly 10 includes a fuel reservoir 22 to hold fuel disposed inside the fuel tank 12. The fuel reservoir 22 has a bottom portion 23 and an annular side portion 24 extending generally perpendicularly from the bottom portion 23 to form a chamber 26. The fuel reservoir 22 is generally bucket-shaped and open at a top end 27 thereof, which defines an overflow fuel level in the fuel reservoir 22. The fuel reservoir 22 also has an inlet cavity 28 formed in the bottom portion 23. The inlet cavity 28 is generally circular in shape and extends upwardly. The fuel reservoir 22 includes an inlet 29 formed as a passageway extending into the side portion 24 and communicating with the inlet cavity 28. It should be appreciated that the top end 27 is above the highest level of new fuel in the fuel tank 12 so that there is little or no in-and-out flow over the top. It should also be appreciated that the top end 27 may be partially closed to minimize splash-over while still venting the interior of the fuel reservoir 22.

The dual barrel jet fuel pump assembly 10 also includes a return fuel member 30 extending upwardly from the bottom portion 23 of the fuel reservoir 22. The return fuel member 30 is tubular and has a generally circular cross-sectional shape. The return fuel member 30 has a passageway 32 extending axially therethrough. The return fuel member 30 is integral and formed as one-piece with the fuel reservoir 22. It should be appreciated that the return fuel member 30 extends into the chamber 26 of the fuel reservoir 22.

The dual barrel jet fuel pump assembly 10 includes a jet pump member 36 extending upwardly from the bottom portion 23 of the fuel reservoir 22. The jet pump member 36 is tubular and has a generally circular crosssectional shape. The jet pump member 36 has a passageway 38 extending axially therethrough. The jet pump member 36 has a cavity 40 in a bottom thereof and communicating with the passageway 38. The jet pump member 36 is integral and formed as one-piece with the fuel reservoir 22. It should be appreciated that the jet pump member 36 extends into the chamber 26 of the fuel reservoir 22.

The dual barrel jet fuel pump assembly 10 also includes a jet pump barrel member 42 extending upwardly from the bottom portion 23 of the fuel reservoir 22. The jet pump barrel member 42 is tubular and has a generally circular cross-sectional shape. The jet pump barrel member 42 has a partition 44 extending therethrough to form a first passageway or jet pump barrel 46 and a second passageway or jet pump barrel 48 and interconnecting the interior of the fuel tank 12. The jet pump barrel member 42 is integral and formed as one-piece with the fuel reservoir 22. It should be appreciated that the jet pump barrel member 42 extends into the chamber 26 of the fuel reservoir 22. It should also be appreciated that the fuel reservoir 22 holds fuel around a jet pump 50 to be described and is filled by fuel coming out of one or both of the jet pump barrels 46 and 48. It should further be appreciated that the jet pump barrels 46 and 48 are sized both diameter and height to optimize their functions.

The dual barrel jet fuel pump assembly 10 includes a secondary or jet pump 50 disposed in the inlet cavity 28 and cooperating with the jet pump member 36. The jet pump 50 has a first projection 52 extending outwardly and disposed in the passageway 32 of the fuel return member 30. The first projection 52 is generally tubular in shape with a generally circular cross-sectional shape. The first projection 52 has an aperture 54 extending therethrough. The jet pump 50 has a second projection 56 extending outwardly and spaced laterally from the first projection 52 and disposed in the cavity 40 of the jet pump member 36. The second projection 56 is generally tubular in shape with a generally circular cross-sectional shape. The second projection 56 has an aperture 58 extending therethrough. The second projection 56 has a seat 60 formed at the end thereof for a function to be described. The jet pump 50 has a chamber 62 communicating with the apertures 54 and 58. The jet pump 50 has a first aperture 64 extending therethrough and communicating with the chamber 62 and the first jet pump barrel 46 of the jet pump barrel member 42. The jet pump 50 has a second aperture 66 extending therethrough and communicating with the chamber 62 and the second jet pump barrel 48 of the jet pump barrel member 42. The jet pump 50 is made of a plastic material. It should be appreciated that the apertures 64 and 66 direct fuel up the jet pump barrels 46 and 48 and can be tuned to perform their respective functions by optimizing their diameters.

The dual barrel jet fuel pump assembly 10 also includes a backpressure relief valve 68 to relief backpressure from the return fuel. The backpressure relief valve 68 is a spherically shaped member or check ball disposed in the cavity 40 between the second projection 56 and the passageway 38 of the jet pump member 36. The dual barrel jet fuel pump assembly 10 includes a spring 70 such as a coil spring disposed in the cavity 40 to urge the backpressure relief valve 68 against the seat 60 of the second projection 56. It should be appreciated that the backpressure relief valve 68 allows excess pressure in the return or bypass line to be relieved when flow is too great to pass through the apertures 64 and 66 of the jet pump 50.

The dual barrel jet fuel pump assembly 10 also includes an inlet connector 72 connected to the inlet 29 of the fuel reservoir 22. The inlet connector 72 is tubular in shape with a generally circular cross-section. The inlet connector 72 has a flange 74 extending outwardly to allow the inlet connector 72 to be inserted into the inlet 29 a predetermined depth. The inlet connector 72 also has a barbed flange 74 extending outwardly at a free end thereof for a function to be described. The inlet connector 72 has a passageway 78 extending axially therethrough. The inlet connector 72 includes a cavity 80 extending axially into the free end thereof for a function to be described. It should be appreciated that the inlet connector 72 is an interface member that presses into the inlet 29 of the fuel reservoir 22 and that a conduit 86 to be described that scavenges remote fuel is attached to it.

The dual barrel jet fuel pump assembly 10 also includes an anti-siphon valve 82 to prevent siphoning of fuel from the fuel reservoir 22. The anti-siphon valve 82 is a spherically shaped member or ball disposed in the cavity 80 of the inlet connector 72. The inlet connector 72 includes a plurality of projections 84 extending into the cavity 80 to prevent the anti-siphon valve 82 from exiting the cavity 80. The anti-siphon valve 82 is disposed in the cavity 80 between the projections 84 and the passageway 78 of the inlet connector 72. It should be appreciated that the anti-siphon valve 82 may be located either in a fuel strainer 88 to be described or between the inlet connector 72 and the fuel reservoir 22 to prevent fuel from siphoning backwards from the intended direction of flow when the dual barrel jet fuel pump assembly 10 is not operating.

The dual barrel jet fuel pump assembly 10 includes a first conduit or hose 86 connected to one end of the inlet connector 72 and extending over the hump 15 to the auxiliary tank portion 13b. The dual barrel jet fuel pump assembly 10 also includes a fuel strainer 88 disposed in the auxiliary tank portion 13b and connected to the end of the first conduit 86. It should be appreciated that the first conduit 86 is disposed over the barb 76 on the inlet connector 72. It should also be appreciated that the strainer 88 minimizes or prevents the ingestion of air or vapor also known as "wicking" and to strain contaminants such as dirt from the fuel before traveling to the jet pump 50 and fuel reservoir 22. It should further be appreciated that the strainer 88 is conventional and known in the art.

The dual barrel jet fuel pump assembly 10 also includes a second conduit or hose 90 connected to one end of the fuel return member 30 and extending through the cover 21 for connection to an engine (not shown) of the vehicle. The dual barrel jet fuel pump assembly 10 further includes a third conduit or hose 92 having one end connected to a high pressure electric fuel pump 93 disposed in the fuel reservoir 22 and extending through the fuel tank cover 21 for connection to the engine. It should be appreciated that the second conduit 90 is disposed in the passageway 32 of the fuel return member 30 and returns fuel to the fuel reservoir 22.

In operation, the dual barrel jet fuel pump assembly 10 is illustrated in an assembled state in FIG. 1 in which fuel 94 is disposed in the fuel tank 12 as illustrated in FIG. 1. Fuel from the engine returns via the second conduit 90 to the return fuel member 30. Fuel flows through the first projection 54 of the jet pump 50 to the chamber 62 therein and exits the first aperture 64 into the first jet pump barrel 46 of the jet pump barrel member 42 and the second aperture 66 into the second jet pump barrel 48 of the jet pump barrel member 42. Fuel flows through the first jet pump barrel 46 and second jet pump barrel 48 and into the chamber 26 of the fuel reservoir 22 to fill the fuel reservoir 22. If there is to much backpressure in the jet pump 62, fuel flows through the aperture 58 in the second projection 56 past the backpressure relief valve 68 and through the cavity 40 and passageway 38 of the jet pump member 36 to the chamber 26 of the fuel reservoir 22. In addition, fuel is strained in the auxiliary tank portion 13b by the strainer 88 and flows through the first conduit 86 to the inlet connector 72. Fuel flows through the cavity 82 past the anti-siphon valve 82 and through the passageway 78 to the second jet pump barrel 48 of the jet pump barrel member 44 and into the chamber 26 of the fuel reservoir 22 to fill the fuel reservoir 22.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A dual barrel jet fuel pump assembly for a fuel tank in a vehicle comprising:
    a reservoir adapted to be disposed in a primary side of the fuel tank and having a top defining an overflow fuel level of said reservoir;
    a first conduit conducting return fuel from an engine of the vehicle to said reservoir;
    a second conduit extending to an auxiliary side of the fuel tank; and
    a dual barrel jet pump disposed in said reservoir and having a first inlet operatively connected to said first conduit and a second inlet operatively connected to said second conduit to fill said reservoir with fuel from the primary side and auxiliary side of the fuel tank.

2. A dual barrel jet fuel pump assembly as set forth in claim 1 wherein said reservoir forms a chamber and includes a return fuel member extending into said chamber and connected to said first conduit.

3. A dual barrel jet fuel pump assembly as set forth in claim 2 wherein said return fuel member has a passageway extending therethrough to receive said first inlet of said jet pump.

4. A dual barrel jet fuel pump assembly as set forth in claim 2 wherein said reservoir includes a jet pump member extending into said chamber and cooperating with said jet pump.

5. A dual barrel jet fuel pump assembly as set forth in claim 4 wherein said jet pump member has a passageway extending therethrough and a cavity to receive an outlet of said jet pump.

6. A dual barrel jet fuel pump assembly as set forth in claim 5 including a pressure relief valve disposed in said cavity between said passageway and the outlet of said jet pump.

7. A dual barrel jet fuel pump assembly as set forth in claim 6 wherein said pressure relief valve comprises a check ball and a spring to urge said check ball against the outlet of said jet pump.

8. A dual barrel jet fuel pump assembly as set forth in claim 1 including a pair of jet pump barrels extending into said chamber and cooperating with an outlet of said jet pump.

9. A dual barrel jet fuel pump assembly as set forth in claim 8 wherein said jet pump has a first outlet and a second outlet, said first outlet communicating with one of said jet pump barrels and said second outlet communicating with the other of said jet pump barrels.

10. A dual barrel jet fuel pump assembly as set forth in claim 1 including an inlet connector disposed at least partially in said second inlet.

11. A dual barrel jet fuel pump assembly as set forth in claim 10 including a strainer disposed in the auxiliary side of the fuel tank to strain fuel flowing therein and said second conduit interconnecting said strainer and said inlet connector.

12. A dual barrel jet fuel pump assembly as set forth in claim 10 including an anti-siphon valve disposed within said inlet connector to prevent fuel siphoning from said fuel reservoir.

13. A dual barrel jet fuel pump assembly for a fuel tank in a vehicle comprising:
    a reservoir adapted to be disposed in a primary side of the fuel tank and having a top defining an overflow fuel level of said reservoir;
    a first conduit conducting return fuel from an engine of the vehicle to said reservoir;
    a second conduit extending to an auxiliary side of the fuel tank; and
    a pair of jet pump barrels extending into said reservoir and cooperating with an outlet of said jet pump;
    a jet pump disposed in said reservoir and having a first inlet operatively connected to said first conduit and a second inlet operatively connected to said second conduit, a first outlet and a second outlet, said first outlet communicating with one of said jet pump barrels and said second outlet communicating with the other of said jet pump barrels to fill said reservoir with fuel from the primary side and auxiliary side of the fuel tank.

14. A dual barrel jet fuel pump assembly as set forth in claim 13 including an inlet connector disposed at least partially in said second inlet.

15. A dual barrel jet fuel pump assembly as set forth in claim 14 including a strainer disposed in the auxiliary side of the fuel tank to strain fuel flowing therein and said second conduit interconnecting said strainer and said inlet connector.

16. A dual barrel jet fuel pump assembly as set forth in claim 14 including an anti-siphon valve disposed within said inlet connector to prevent fuel siphoning from said fuel reservoir.

17. A dual barrel jet fuel pump assembly as set forth in claim 13 wherein said reservoir forms a chamber and includes a return fuel member extending into said chamber and connected to said first conduit.

18. A dual barrel jet fuel pump assembly as set forth in claim 17 wherein said return fuel member has a passageway extending therethrough to receive said first inlet of said jet pump.

19. A dual barrel jet fuel pump assembly as set forth in claim 13 wherein said reservoir includes a jet pump member extending into said chamber and cooperating with said jet pump.

20. A dual barrel jet fuel pump assembly as set forth in claim 19 wherein said jet pump member has a passageway extending therethrough and a cavity to receive an outlet of said jet pump.

21. A dual barrel jet fuel pump assembly as set forth in claim 20 including a pressure relief valve disposed in said cavity between said passageway and the outlet of said jet pump.

22. A dual barrel jet fuel pump assembly as set forth in claim 21 wherein said pressure relief valve comprises a check ball and a spring to urge said check ball against the outlet of said jet pump.

23. A dual barrel jet fuel pump assembly as set forth in claim 13 wherein said jet pump barrels are integral and on e-piece with s aid reservoir.

24. A fuel tank assembly for a vehicle comprising:
   a fuel tank forming a saddle shape having a primary side and an auxiliary side separated by a hump;
   a fuel reservoir disposed in said primary side of said fuel tank and having a top defining an overflow fuel level of said reservoir;
   a first conduit conducting return fuel from an engine of the vehicle to said reservoir;
   a second conduit extending over said hump to said auxiliary side of said fuel tank; and
   a dual barrel jet pump disposed in said reservoir and having a first inlet operatively connected to said first conduit and a second inlet operatively connected to said second conduit to fill said reservoir with fuel from said primary side and said auxiliary side of said fuel tank.

* * * * *